United States Patent
Beau et al.

(10) Patent No.: US 10,131,128 B2
(45) Date of Patent: Nov. 20, 2018

(54) METHOD IN WHICH A VEHICLE INTERIOR TRIM PART WITH A DECOR LAYER COMPRISING PAPER LAYERS IS PRODUCED

(71) Applicant: Faurecia Innenraum Systeme GmbH, Hagenbach (DE)

(72) Inventors: Godefroy Beau, La Garenne Colombes (FR); Hugo Piccin, Deisenhofen (DE); Maxime Salandre, Paterna (ES)

(73) Assignee: FAURECIA INNENRAUM SYSTEME GMBH, Hagenbach (DE)

( * ) Notice: Subject to any disclaimer, the term of this patent is extended or adjusted under 35 U.S.C. 154(b) by 339 days.

(21) Appl. No.: 14/945,100

(22) Filed: Nov. 18, 2015

(65) Prior Publication Data

US 2016/0136939 A1   May 19, 2016

(30) Foreign Application Priority Data

Nov. 18, 2014 (DE) .......................... 10 2014 223 542

(51) Int. Cl.
*B32B 37/02* (2006.01)
*B32B 37/10* (2006.01)
(Continued)

(52) U.S. Cl.
CPC ............ *B32B 38/0004* (2013.01); *B26D 3/00* (2013.01); *B29C 43/003* (2013.01); *B29C 45/1418* (2013.01); *B29C 45/14336* (2013.01); *B29C 45/14631* (2013.01); *B32B 3/16* (2013.01); *B32B 7/12* (2013.01); *B32B 23/06* (2013.01);
(Continued)

(58) Field of Classification Search
CPC ......... Y10T 156/1041; Y10T 156/1044; Y10T 156/1075; B32B 37/0038; B32B 37/02; B32B 37/10; B32B 37/18; B32B 38/08; B32B 38/10; B32B 38/1808; B32B 38/0004; B32B 2038/0064; B32B 3/16;
(Continued)

(56) References Cited

U.S. PATENT DOCUMENTS 3,291,298 A * 12/1966 McCue .................... B27M 3/02
144/13
2012/0107571 A1   5/2012 Schlemmer et al.

FOREIGN PATENT DOCUMENTS

DE   102008030572 A1   12/2009
DE   102009026537 A1   12/2010
DE   102013202095 A1   8/2014

OTHER PUBLICATIONS

Machine translation of DE102013202095 A1 published Aug. 14, 2014.*

(Continued)

*Primary Examiner* — Linda L Gray
(74) *Attorney, Agent, or Firm* — Reising Ethington P.C.

(57) ABSTRACT

A method in which an interior trim part for a vehicle is produced. The method includes the steps of providing a block of material comprising a plurality of paper layers connected to each other by at least one resin, cutting the block into slices, wherein a cutting plane has an angle between 5° and 85° in relation to layer planes of the paper layers, providing a flexible support layer and applying at least one of the slices to the flexible support layer to obtain a flexible composite layer, and providing a rigid carrier and applying the flexible composite layer directly or indirectly to the carrier.

12 Claims, 3 Drawing Sheets

(51) Int. Cl.
  *B32B 37/18*   (2006.01)
  *B32B 38/04*   (2006.01)
  *B32B 38/10*   (2006.01)
  *B32B 38/00*   (2006.01)
  *B26D 3/00*    (2006.01)
  *B29C 45/14*   (2006.01)
  *B32B 3/16*    (2006.01)
  *B32B 7/12*    (2006.01)
  *B32B 23/06*   (2006.01)
  *B29C 43/00*   (2006.01)
  *B29K 711/12*  (2006.01)
  *B29L 31/30*   (2006.01)
  *B32B 37/12*   (2006.01)
  *B29C 43/20*   (2006.01)
  *B32B 5/24*    (2006.01)
  *B32B 5/26*    (2006.01)
  *B32B 29/00*   (2006.01)
  *B32B 29/02*   (2006.01)
  *B32B 1/00*    (2006.01)
  *B32B 3/18*    (2006.01)

(52) U.S. Cl.
  CPC ............ *B32B 37/10* (2013.01); *B29C 43/203* (2013.01); *B29K 2711/12* (2013.01); *B29L 2031/30* (2013.01); *B32B 1/00* (2013.01); *B32B 3/18* (2013.01); *B32B 5/245* (2013.01); *B32B 5/26* (2013.01); *B32B 29/002* (2013.01); *B32B 29/005* (2013.01); *B32B 29/02* (2013.01); *B32B 2037/1215* (2013.01); *B32B 2260/028* (2013.01); *B32B 2260/046* (2013.01); *B32B 2266/0278* (2013.01); *B32B 2272/00* (2013.01); *B32B 2307/546* (2013.01); *B32B 2307/732* (2013.01); *B32B 2307/738* (2013.01); *B32B 2317/12* (2013.01); *B32B 2451/00* (2013.01); *B32B 2605/003* (2013.01); *B32B 2605/08* (2013.01); *Y10T 156/1041* (2015.01); *Y10T 156/1044* (2015.01); *Y10T 156/1075* (2015.01)

(58) Field of Classification Search
  CPC .. B32B 3/18; B32B 7/12; B32B 23/06; B29C 43/003; B29C 43/203
  See application file for complete search history.

(56) References Cited

OTHER PUBLICATIONS

German Search Report corresponding to DE application No. 102014223542.1, dated Oct. 12, 2015, 7 pages, not translated.

\* cited by examiner

METHOD IN WHICH A VEHICLE INTERIOR TRIM PART WITH A DECOR LAYER COMPRISING PAPER LAYERS IS PRODUCED

TECHNICAL FIELD

The invention relates to a method in which a vehicle interior trim part is produced. The trim part produced includes a decor layer comprising a plurality of paper layers which are connected to each other by at least one resin. Such a decor layer provides an interesting appearance and, in addition, can be formed at least partially from a recycled material. This is desirable in view of environmental protection aspects.

BACKGROUND

From the prior art it is known to mill a block of a material comprising multiple layers of paper and a resin connecting the layers to one another in order to provide a decor layer for a vehicle trim part. This method has severe disadvantages. For example, milling causes a large amount of waste material. Furthermore, milling is time demanding and requires expensive tools. Despite these disadvantages, milling is used in the prior art because the brittleness of the block of material renders alternative methods for processing the material problematic.

SUMMARY

In view of the above-mentioned disadvantage it is an object of the invention to provide a method for producing a vehicle interior trim part with a decor layer comprising a plurality of paper layers connected to each other by at least one resin with less waste material and/or with less hours of work.

This object is solved by the method of claim 1. Optional features form the subject matter of the dependent claims.

According to an aspect of the invention, a block of material, which comprises a plurality of paper layers connected to each other by at least one resin, is cut into slices along a cutting plane that is at an angle between 5° and 85° in relation to layer planes of the paper layers. The term "cutting" should be interpreted such that sawing is considered a type of cutting. The applicant has found that it is possible to cut the material into slices without destroying the material if the angle of the cutting plane is in the above-mentioned range. By an angle in the above mentioned range, pressure cutting is avoided.

The slice of material is applied to a flexible support layer. Thereby, a flexible composite layer is obtained. Surprisingly, this flexible composite layer can be bent without damaging the slice of material which is a part of the flexible composite layer. This allows applying the flexible composite layer directly or indirectly to a rigid carrier, wherein the flexible composite layer is bent into a desired shape. The flexible composite layer is applied to the rigid carrier such that the flexible support layer is arranged between the rigid carrier and the slice of material. The slice of material can be glued on the flexible support layer, for example by a lamination process. In the lamination process, the slice of material can be pressed on the flexible support layer with a pressure which might be, for example, between 0.5 bar and 10 bar. A temperature of slice of material and/or the flexible support during the lamination process can for example be between 40° C. and 130° C. By such temperatures and pressures, sufficient impregnation and activation is assured. As glue, for example a water based glue (such as, for example, Acrylic glue) or a dry glue (such as a hot melt polyurethane) might be used.

In the context of this patent application, a cutting plane is considered to be at an angle between 5° and 85° in relation to layer planes of the paper layers when it is at an angle within said range in relation to the layer planes of at least 80%, preferably at least 90% and most preferably at least 99% of the paper layers.

Preferably, the cutting plane is at an angle between 5° and 80°, more preferably between 8° and 70° and most preferably between 10° and 60° in relation to layer planes of the paper layers. All ranges which comprise one of the lower limits of one of the above ranges and an upper limit of another of the above ranges shall also be considered disclosed. Smaller angles than 5° significantly increase the risk of cleaving the block material. Angles larger than 85° increase the risk of damaging the paper layers.

If a mechanical cutting tool (such as, for example, a saw) is used for cutting the bock material, the cutting tool contacts each paper layer on a first side, then cuts the respective paper layer, and leaves the paper layer again on a second side. Preferably, the first sides (i.e. the sides of the paper layers which are contacted by the by cutting tool immediately before the respective layer is cut) comprise a surface normal which faces out of the slice to be cut. This assures, that the block material is not cleaved along the paper layer in such a manner that fissures in the slice of material are formed.

With the above-mentioned angle, for each paper layer the smallest angle between the cutting plane and a paper plane of the respective paper layer is meant. This is important when the paper layer is bent into a non-planar shape such that an angle between the cutting plane and a layer plane of the paper layer is not constant throughout the paper layer. As mentioned, the smallest angle between the paper layer and the cutting plane is considered in this case.

The block of material and/or the slices may comprise at least 10 paper layers, preferably at least 500 paper layers, most preferably at least 1000 paper layers. The block of material from which slices are cut off, may have a thickness in a direction perpendicular to the paper layer plane of more than 20 cm, preferably more than 35 cm and can be up to 60 cm, more preferably of up to 80 cm. Depending on the cutting angle this may result in slices of various sizes depending on the size of the paper layers in the layer plane.

The block of material can comprise lignin and/or cellulose; at least one glue, resin, or wax as a paste contained in the paper; optionally further additives or fillers contained in the paper layers; and at least one resin connecting the paper layers to each other. A content of lignin and/or cellulose (or a sum of the content of lignin and cellulose) can be lower than 95%, preferably lower than 90% and most preferably lower than 80% (in the context of this application, all percentages mean weight percentages). A content of resin can be higher than 10%. Such a low content of lignin is preferred because a sufficient amount of resin is required in order to reliably connect the paper layers to each other. Preferably the lignin content is at least 30% and most preferably at least 50%. A lignin content which is lower than 60% results in a decor layer which is not sufficiently influenced by the paper layers both regarding the optical appearance as well as the mechanical properties. However, a decor layer which is influenced by the paper layers is desirable. The paper layers might consist of recycled newspaper. A weight of the paper layer can be lower than a weight of the resin connecting the paper layers to each other. The above percentages refer to the dry block material. However, the bloc material can be processed in wet condition. In the wet condition, the content of resin (including a solvent of the resin, which is preferably water) can be larger than a content of cellulose and/or lignin.

The resin contain in the block material can be a water based glue, for example a vinyl or acrylic glue.

The flexible support layer may comprise a textile, such as a woven or non-woven textile sheet. The textile material may comprise one or more of the following materials or may consists out of one or more of the following materials: cotton, hemp, sisal, kenaf, or other natural long fibers or thermoplastic fibers or a mixture of natural and thermoplastic fibers. The flexible support can be thermoformable in order to simplify the application of the flexible composite layer (which includes the flexible support layer) to the rigid carrier.

The flexible composite layer can be applied to the rigid carrier by laminating. For example, the flexible composite layer can be laminated directly onto a front side of the rigid carrier. Alternatively, the flexible composite layer can be laminated onto an intermediate layer which is connected to the rigid carrier. The intermediate layer can be connected to the rigid carrier before, after or during application of the flexible composite layer to the intermediate layer. As intermediate layer, for example a foam layer or a textile may be used.

The flexible composite layer can be applied to the rigid carrier during production of the rigid carrier. A plastic material from which the rigid carrier is formed can be injected into a cavity of a tool such that the plastic material is in contact with a rear side of the flexible composite while the plastic material hardens.

Also, the flexible composite layer can be applied to the rigid carrier by placing the rigid carrier and the flexible composite layer into a foaming tool such that a foaming cavity is formed between the flexible composite layer and the rigid carrier. Subsequently, a foaming material, for example a plastic foam such as polyurethane foam, is injected into the foaming cavity. The hardening foaming material fixes the flexible composite layer to the rigid material.

In order to achieve a smooth interior trim part, a surface of the slice may be smoothed to reduce or to eliminate its roughness. The surface may for example be sanded or polished. The smoothing can be carried out, for example, after the slice has been applied to the flexible support layer to form a flexible composite layer.

In order to achieve a flexible composite layer with sufficient flexibility, the block of material can be cut into slices comprising a thickness of less than 2 mm, preferably less than 1.5 mm and most preferably less than 1 mm. However, in order to assure a sufficient strength and abrasion resistance of the vehicle interior trim part, the block of material can be cut into slices comprising a thickness of at least 0.1 mm, preferably at least 0.3 mm and most preferably at least 0.5 mm. A very good compromise between strength and flexibility of the slices can be achieved when the block of material is cut into slices with a thickness between 0.5 mm and 0.8 mm.

The block material can be prepared by soaking multiple paper layers with resin and pressing the multiple paper layers together. For example, the paper layers can be pressed together with a presser roll or other type of press. The press can be heated in order to harden the resin. The block of material, after soaking the paper layers with resin and before the block is heated, can have a content of resin (including the solvent of the resin) which is higher than the content of lignin, cellulose or a mixture of lignin and cellulose.

In addition to a method, a vehicle interior trim part comprising a decor layer and a carrier to which the decor layer is connected, wherein the decor layer comprises a sheet of material and a flexible support layer to which the slice of material is fixed, wherein the slice of material comprises a plurality of paper layers and a resin connecting the paper layers to each other, wherein the paper layers are arranged such that layer planes of the paper layers run at an angle between 5° and 85° in relation to a layer plane of the slice of material may also be regarded as part of the invention. This trim part may be produced by a method as described above.

The vehicle interior trim part may comprise an intermediate layer arranged between the decor layer and the rigid carrier. The intermediate layer may comprise a foam or textile. Alternatively, the decor layer can be connected directly to the rigid carrier.

BRIEF DESCRIPTION OF THE DRAWINGS

The invention is further described in connection with the figures of which.

DETAILED DESCRIPTION OF THE ILLUSTRATED EMBODIMENT(S)

Figure 1:
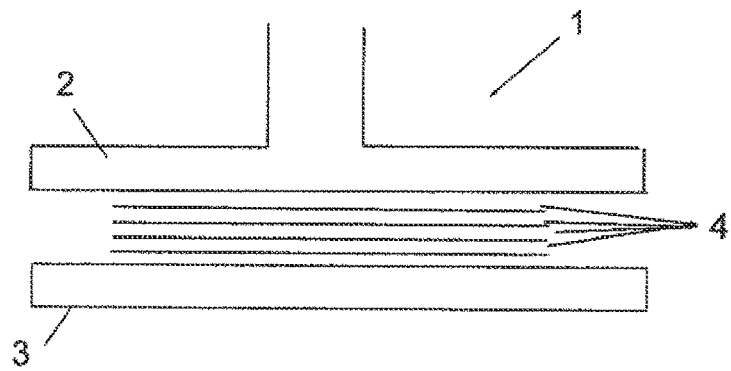
FIG. 1 is a side view of a press in which a plurality of paper layers is arranged.

FIG. 1 shows a press 1 comprising an upper part 2 and a lower part 3. Between both parts 2, 3 of the press, a plurality of paper layers 4 are arranged. In a first step of a method for producing an interior trim part of a vehicle, the paper layers, which are soaked with a resin, are pressed together and heated in order to provide a block 5 of material comprising a plurality of paper layers and a resin connecting the paper layers.

Although in FIG. 1 a press is shown which presses multiple layers of paper together in a planar orientation, this is not necessary. In an alternative first step of the method, multiple paper layers are rolled up in order to provide a roll shaped block of material.

Figures 2A, 2B:
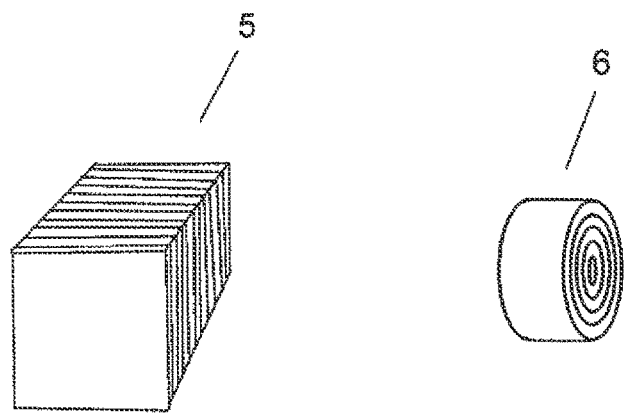
FIGS. 2a and 2b are perspective views of different blocks of material.

A block of material produced as described above in connection with FIG. 1 is shown in FIG. 2a. Although only a small number of layers is shown, wherein each layer appears to have a relatively large thickness, the block of material 5 can comprise a much larger number of paper layers than shown, wherein each paper layer—compared to the external dimensions of the block of material 5—has a much smaller thickness than shown. FIGS. 2a and 2b are both not true to scale.

In FIG. 2b, an alternative block of material 6 is shown which has been produced by rolling up paper layers in order to provide a roll shaped block of material 6.

Figure 3:
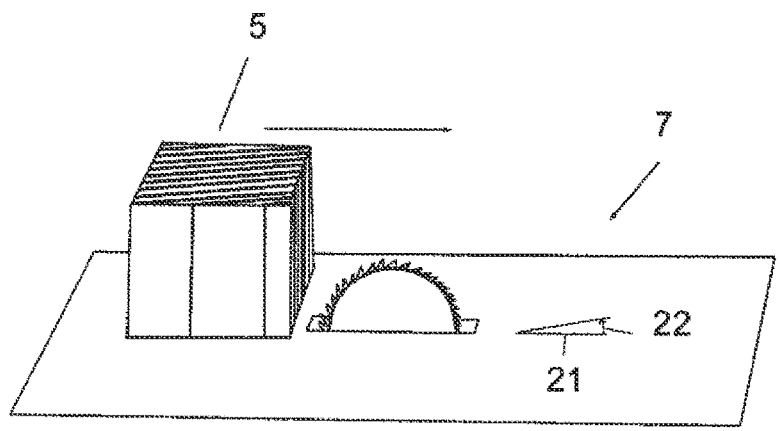
FIG. 3 is a perspective view of a cutting machine for cutting a block of material into slices.

In a subsequent step of the method, the block of material is cut into slices. FIG. 3 shows an exemplary cutting machine 7 with which a block 5 is cut into slices. However, any other cutting device known from the prior art suitable for slicing the block of material may be used instead of the depicted cutting machine. The cutting plane 21 is chosen such that an angle 22 between the layer planes of the paper layers and a cutting plane is between 5° and 85°, for example 10°, although in some embodiments angles up to 90° may be used.

Figure 4A:
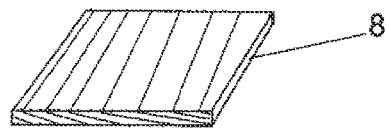
FIGS. 4a and 4b are perspective views of slices of the blocks of material shown in FIGS. 2a and 2b, respectively.
Figure 4B:
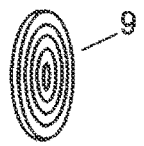

FIGS. 4a and 4b shows slices 8, 9 of the blocks of material of FIGS. 2a and 2b, respectively. As can be seen, the layer planes of the paper layers run at an angle of about 90° in relation to a layer plane of the slice of material 8, 9 (which means the plane which is parallel to the two larger dimensions of the slices and orthogonal to the smallest dimension of the slices).

After slicing, the slices 8, 9, which are very fragile, are applied to a flexible support layer 10. In this embodiment, the slices 8, 9 are laminated to the flexible support layer 10; however, other methods for applying the slices to the flexible support layer could be used instead. In order to laminate the slice of material onto the support layer, a hot melt polyurethane can be applied to the slice of material, and the latter can be heated to 120° C. and pressed against the support layer with a pressure of 5 bar. Without the flexible support layer, the fragility of the slices 8, 9 would render them not usable in vehicle interior trim parts. However, a composite layer 11 formed from the flexible support layer 10 and the slice of material 8 is less fragile and can be bent into a desired shape.

Figure 5A:
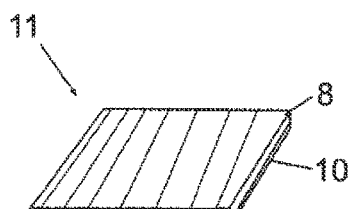
FIGS. 5a and 5b are perspective views of a flexible composite material and a flexible support layer.
Figure 5B:
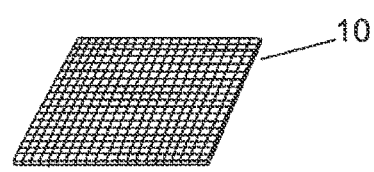

The flexible composite layer 11 comprising the slice of material of FIG. 4a and the flexible support layer is shown in FIG. 5a. As the flexible support layer 10, a textile layer is used. The textile layer used 10 for the composite layer 11 is shown in FIG. 5b. In the depicted embodiment, a woven layer is used as the flexible support layer 10.

Figure 6A:
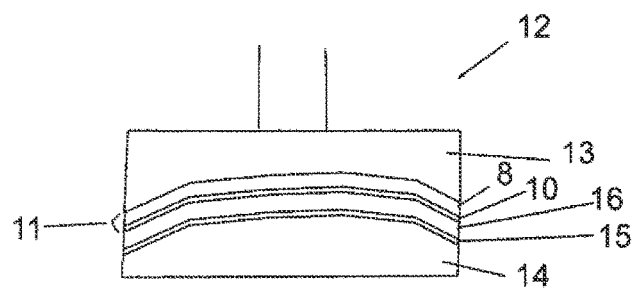
FIGS. 6a, 6b and 6c are side views of different tools for providing a vehicle interior part.

In a further method step, the flexible composite layer 11 is attached to a rigid carrier to form a vehicle interior trim part. In a first embodiment of this method step, the flexible composite layer 11 is introduced into a press 12 comprising an upper die 13 and a lower die 14. The dies 13, 14 have a shape corresponding to a desired shape of a vehicle interior trim part to be produced. In addition to the flexible composite layer 11, a rigid carrier 15 and, optionally, an intermediate layer 16 are introduced into the press 12. The press 12 with the flexible composite layer 11, the rigid carrier 15 and the intermediate layer 16 is shown in FIG. 6a. In order to facilitate the shaping of the flexible composite layer 11, one or both of the dies may be heated. By the heat of the dies, the flexible support layer 10 may be melted to the intermediate layer 16. A resin which may be applied onto the rigid carrier 15 and/or the intermediate layer and/or the flexible support layer may also be activated by the heat of the dies.

In an alternative embodiment (not shown), the flexible composite layer 11 may be applied directly onto the rigid carrier 15 without an intermediate layer 16 in between.

Figure 6B:
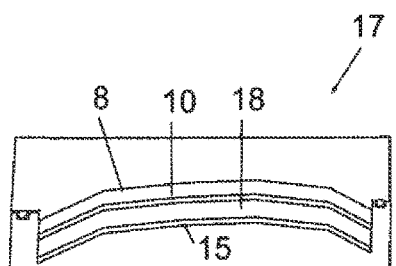

According to a further embodiment of the method, the flexible composite layer 11 as well as the rigid carrier 15 are introduced into a foaming tool 17 such that a cavity 18 is formed between the flexible composite layer 11 and the rigid carrier 15. Into this cavity 18 a foaming material may be introduced in order to form a foam layer. The foam layer hardens and connects the flexible composite layer 11 to the rigid carrier 15. The foaming tool 17 with the flexible composite layer 11 and the rigid carrier is shown in FIG. 6b.

Figure 6C:
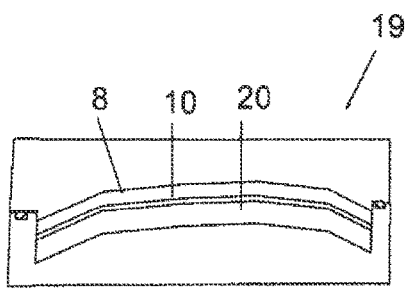

In a further embodiment of the method, the flexible composite layer 11 is introduced into a mold 19 for injection molding such that a cavity 20 is delimited by the mold 19 and the flexible composite layer 11. A plastic material is injected into the cavity 20. The plastic material, after hardening, forms a rigid carrier. The plastic material may be hot at the time it is injected into the cavity 20. The heat of the plastic material may soften the flexible composite layer 11 and thus may ease the deformation of the latter into the desired final shape. The mould 19 for injection molding together with the flexible composite layer is shown in FIG. 6c.

Figure 7:
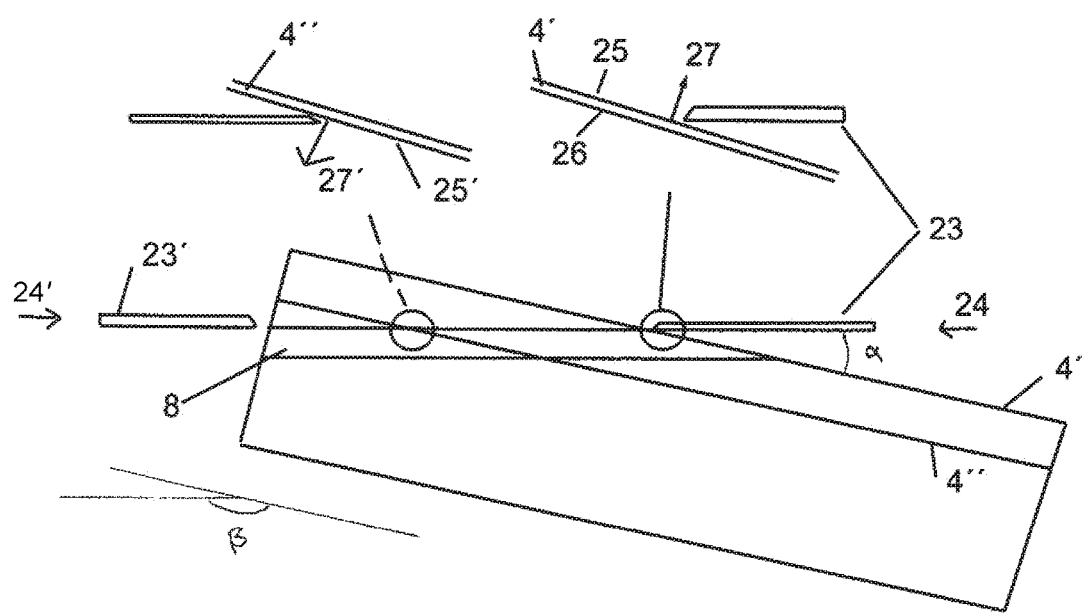
FIG. 7 is a schematic view in order to explain the cutting direction.

With help of FIG. 7, the importance of the cutting direction is subsequently explained. In FIG. 7 two paper layers 4' and 4" are shown. There are further paper layers which are parallel to layers 4' and 4", wherein said further paper layers are not shown for sake of having a clear schematic figure.

In the top right part of FIG. 7, a first saw 23 is shown, which is advanced in a direction 24. The saw first contacts the topmost paper layer 4' on its first side 25, before it passes through the paper layer 4' and leaves the latter through the second side 26. When the paper layer is 4' compressed during the cutting operation, the layer exerts a force onto the saw 23, wherein the force is directed in the direction of the surface normal 27 of the first side. This force pushes the saw 23 in the direction away from the slice of material 8. Therefore, in case the saw 23 is bent by forces exerted onto the saw 23 by the first side 25 of the paper layer 4', the slice 8 to be produced is not damaged. Therefore, advancing a cutting tool (such as saw 23) in direction 24 is desirable.

By contrast, advancing the second saw 23' in direction 24' would possibly provide an undesirable result. The surface normal 27' of the first side 25' faces towards the inside of the slice of material 8. If the saw 23' is bent by a force caused by the contact with the first side 25', the saw 23' possibly damages the slice 8. Therefore, the cutting direction is preferably chosen such that the surface normal 27 of the first side 26 faces out of the slice 8 to be produced.

While both situations, cutting in the direction 24 or in the direction 23' is possible, a preferred embodiment is cutting in the direction 24. This is illustrated by angle α between the cutting plane along direction 24 and a layer plane of paper 4', where α is around 10° in the shown embodiment. The angle in this embodiment is defined as the angle between the cutting plane and the paper plane in a clockwise direction, when the cutting direction is from the right to the left and in a counter-clockwise direction, when the cutting direction is from the left to the right. It can be easily seen that shown angle α, between the cutting plane and the layer plane of the paper when cutting along direction 24 (from right to left) is measured clockwise. Cutting from direction 23' corresponds to a counter-clockwise angle β of around 170° when keeping the orientation of the paper layers 4' and 4", but cutting from left to right.

The invention claimed is:

1. Method in which an interior trim part for a vehicle is produced, comprising the steps:
providing a block of material comprising a plurality of paper layers connected to each other by at least one resin;
cutting the block into slices along a cutting plane that has an angle between 5° and 85° in relation to layer planes of the paper layers, wherein the block is cut with a cutting tool, wherein the cutting tool cuts each paper layer by contacting the paper layer on a first side, then passes through the paper layer and leaves the paper layer again on a second side, wherein the first side of each of the paper layers has a surface normal facing out of the slice to be cut;

providing a flexible support layer and applying at least one of the slices to the flexible support layer to obtain a flexible composite layer; and providing a rigid carrier and applying the flexible composite layer directly or indirectly to the carrier.

2. Method according to claim 1, wherein the block of material provided comprises a content of resin which is higher than 10 wt % of a total weight of the block of material and/or a content of cellulose, lignin or a mixture thereof which is lower than 90 wt % of a total weight of the block of material.

3. Method according to claim 1, wherein the flexible composite layer is laminated onto the rigid carrier.

4. Method according to claim 1, wherein the carrier is provided and connected to the flexible composite layer in one integral step.

5. Method according to claim 4, wherein the carrier is provided and connected to the flexible composite layer by back injecting a plastic material into a mold and into contact with the composite layer.

6. Method according to claim 1, further comprising the step of smoothing a surface of the slices.

7. Method according to claim 1, wherein the slice cut from the block of material is smoothed after it has been applied to the flexible support layer.

8. Method according to claim 7, wherein the slice of the block of material is smoothed after the composite layer has been applied to the carrier.

9. Method according to claim 1, wherein the block of material is cut into slices which comprise a thickness of less than 2 mm.

10. Method according to claim 9, wherein the thickness is less than 1.5 mm.

11. Method according to claim 10, wherein the thickness is less than 1 mm.

12. Method according to claim 1, wherein the block of material is provided by soaking multiple paper layers with resin and pressing the multiple paper layers together.

* * * * *